(12) United States Patent
Marchant

(10) Patent No.: US 10,620,705 B2
(45) Date of Patent: Apr. 14, 2020

(54) VIBRATING THE SURFACE OF AN ELECTRONIC DEVICE TO RAISE THE PERCEIVED HEIGHT AT A DEPRESSION IN THE SURFACE

(71) Applicant: Google LLC, Mountain View, CA (US)

(72) Inventor: James Marchant, Cambridgeshire (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/995,892

(22) Filed: Jun. 1, 2018

(65) Prior Publication Data

US 2019/0369730 A1   Dec. 5, 2019

(51) Int. Cl.
*G06F 3/01* (2006.01)
*G06F 3/041* (2006.01)
*G06F 3/0488* (2013.01)

(52) U.S. Cl.
CPC ............ *G06F 3/016* (2013.01); *G06F 3/0412* (2013.01); *G06F 3/0414* (2013.01); *G06F 3/04886* (2013.01)

(58) Field of Classification Search
CPC ...... G06F 3/016; G06F 3/0412; G06F 3/0414; G06F 3/04886; G06F 2203/04103; G06F 2203/04105; H04W 52/0254
See application file for complete search history.

(56) References Cited

U.S. PATENT DOCUMENTS 8,378,797 B2   2/2013 Pance et al.
9,760,241 B1*  9/2017 Lewbel ............... G06F 3/04812
2002/0149561 A1* 10/2002 Fukumoto .......... G01C 21/3664
                                                  345/156
2010/0231367 A1   9/2010 Cruz-Hernandez et al.
2010/0259368 A1* 10/2010 Fahn ...................... G06F 3/041
                                                  340/384.1
2010/0315348 A1* 12/2010 Jellicoe .................. G06F 3/041
                                                  345/173

(Continued)

FOREIGN PATENT DOCUMENTS

WO    WO199709842    3/1997
WO    WO199709859    3/1997

(Continued)

OTHER PUBLICATIONS

PCT International Search Report and Written Opinion in International Appln. No. PCT/GB2019/051455, dated Aug. 26, 2019, 16 pages.

*Primary Examiner* — Tom V Sheng
(74) *Attorney, Agent, or Firm* — Fish & Richardson P.C.

(57) ABSTRACT

In general, the subject matter described in this disclosure can be embodied in methods, systems, and program products for detecting, by a computing system, that user input has contacted or is about to contact transparent material at a location of a depression in a planar surface of the transparent material. The computing system vibrates, in response to the computing system detecting that the user input has contacted or is about to contact the transparent material at the location of the depression, the transparent material at the location of the depression using one or more transducers. The computing system ceases the vibration of the transparent material at the location of the depression in response to the computing system determining that criteria for ceasing the vibration has been satisfied.

21 Claims, 9 Drawing Sheets

(56) References Cited

U.S. PATENT DOCUMENTS

| | | | |
|---|---|---|---|
| 2011/0012717 A1* | 1/2011 | Pance | G06F 3/016 340/407.2 |
| 2011/0163985 A1* | 7/2011 | Bae | G06F 3/016 345/173 |
| 2012/0268412 A1 | 10/2012 | Cruz-Hernandez et al. | |
| 2013/0113760 A1* | 5/2013 | Gossweiler, III | G06F 3/016 345/177 |
| 2013/0127755 A1* | 5/2013 | Lynn | G08B 6/00 345/173 |
| 2014/0098038 A1* | 4/2014 | Paek | G06F 1/1692 345/173 |
| 2015/0002477 A1* | 1/2015 | Cheatham, III | G06F 3/016 345/177 |
| 2015/0003204 A1* | 1/2015 | Cheatham, III | G06F 3/016 367/93 |
| 2016/0327980 A1 | 11/2016 | Farahani et al. | |
| 2017/0285848 A1* | 10/2017 | Rosenberg | G06F 3/0202 |
| 2017/0344251 A1* | 11/2017 | Hajimusa | G06F 3/04842 |
| 2017/0363919 A1* | 12/2017 | Li | G02F 1/134336 |
| 2018/0067622 A1 | 3/2018 | Chaudhri et al. | |
| 2018/0349009 A1* | 12/2018 | Breme | A47L 15/4293 |
| 2019/0004690 A1* | 1/2019 | Geyer | D06F 33/02 |

FOREIGN PATENT DOCUMENTS

| | | |
|---|---|---|
| WO | WO199834320 | 8/1998 |
| WO | WO199913684 | 3/1999 |
| WO | WO1999011490 | 3/1999 |
| WO | WO1999041939 | 8/1999 |
| WO | WO2000002417 | 1/2000 |
| WO | WO200013464 | 3/2000 |
| WO | WO2000054548 | 9/2000 |
| WO | WO200154450 | 7/2001 |
| WO | WO2005025267 | 3/2005 |
| WO | WO2006125967 | 11/2006 |
| WO | WO2008145949 | 12/2008 |
| WO | WO2009074826 | 6/2009 |
| WO | WO2010016627 | 2/2010 |
| WO | WO2010092397 | 8/2010 |
| WO | WO2010112937 | 10/2010 |
| WO | WO2010116163 | 10/2010 |
| WO | WO2011001158 | 1/2011 |
| WO | WO2011039545 | 4/2011 |
| WO | WO2011051722 | 5/2011 |
| WO | WO2013050769 | 4/2013 |
| WO | WO2013144602 | 10/2013 |
| WO | WO2013171512 | 11/2013 |
| WO | WO2013171513 | 11/2013 |
| WO | WO2013171514 | 11/2013 |

* cited by examiner

FIG. 3A

330
Vibrate the material at the location of the depression using one or more transducers

332
Vibrating causes an effect in which the depression is perceived by a user to have substantially no depth with respect to the planar surface

334
Simultaneously vibrate multiple transducers at different frequencies or amplitudes to generate a vibratory effect localized to the depression

340
Cease vibration of the material at the location of the depression in response to determining that criteria for ceasing the vibration has been satisfied

342
Criteria includes the user input ceasing contact with the location of the depression as the user input moves across the planar surface

344
Criteria includes the computing system having vibrated at the location of the depression for a first length of time

346
Criteria includes area of contact between transparent material and an object having increased from to a larger, predetermined area of contact

350
Subsequently vibrate the surface of the material at the location of the depression while the user input remains in contact with the material at the location of the depression

352
Criteria includes the computing system having not vibrated at the location of the depression for a second length of time

354
Criteria includes the area of contact having decreased to a smaller, second predetermined area of contact

360
Computing system is configured to not vibrate at a non-depressed location should the computing system detect that the user input instead contacted the material at a non-depressed location while the computing system was in a same state

370
Computing system is configured to no vibrate should the computing system have detected the user input while a previous user input was in contact with a non-depressed location of the planar surface while the computing system was in a same state

380
Computing system vibrated the material in response to the computing system being in a first mode in which the computing system is configured to vibrate the material in response to user input at the depression

382
Detect a second user input at the location of the depression while the computing system is in a second mode in which the computing system is configured to not vibrate in response to user input at the depression

384
First mode comprises the computing system being on with the display device in a display-on mode and presenting content

386
Second mode comprises a display-off mode in which the computing system is on and the display device is off or substantially off

388
Computing system does not cause the material to vibrate at any location in response to user input contacting the depression in the second mode

390
Detect that the user input contacted the material at a non-depressed location and moved across the planar surface to the location of the depression

392
Computing system does not vibrate any location while the user input was moving across the planar surface until the computing system detects that the user input has contacted or is about to contact the depression

FIG. 3D

VIBRATING THE SURFACE OF AN ELECTRONIC DEVICE TO RAISE THE PERCEIVED HEIGHT AT A DEPRESSION IN THE SURFACE

TECHNICAL FIELD

This document generally relates to haptic feedback by electronic devices.

BACKGROUND

Some computing devices, such as mobile telephones with touchscreens, vibrate in response to certain types of user input. For example, a mobile telephone may vibrate for a brief period of time when a user touches a virtual button presented by a touchscreen of the mobile telephone. The vibration can provide the user with a tactile acknowledgment that the virtual button has been pressed.

SUMMARY

This document describes techniques, methods, systems, and other mechanisms for vibrating the surface of an electronic device to raise the perceived height at a depression in the surface. In general, a computing device may vibrate one or more transducers in response to user input contacting a surface of the computing device. The vibrating can provide a user with tactile confirmation that the user has contacted a portion of the computing device that corresponds to a virtual button. Vibrating the computing device, however, uses energy resources and a similar tactile feedback mechanism can be provided by manufacturing the computing device with a depression at a location of a virtual button. In particular, a depression in an otherwise planar surface allows a user to feel that he or she has contacted the portion of the computing device at which the virtual button is located.

Still, it may not always be desirable for users to feel the depression, for example, in circumstances in which a virtual button is not active at the location of the depression. In such circumstances, the computing device may vibrate when user input is in contact with the surface of the computing device at the location of the virtual button, because a vibrating surface may provide a user with the perception that the surface is raised above its actual height. As such, selectively vibrating a surface of a computing device when user input contacts a location of a depression in the surface, and not vibrating the surface when user input contacts adjacent, non-depressed regions of the surface, can provide a user the impression that the surface of the computing device is flat or substantially flat.

Implementations of the technology discussed in this disclosure can provide various advantages. For example, a computing device can provide a user with tactile feedback that the user has touched the location of a virtual button without using energy resources required to activate one or more transducers. Such techniques can be particularly useful when a computing device is in a low-power mode, for example when the computing device is in a sleep mode or a screen-off mode. Still, when the computing device is in a mode in which tactile feedback at the location of the depression is not desired, the computing device can vibrate when user input contacts the depression, which raises the perceived height of the surface at the location of the depression.

Further, a computing system can use the presence of the depression in combination with haptic vibratory feedback to provide certain types of tactile feedback mechanisms. For example, a button-clicking user input mechanism can be provided by vibrating the surface of the computing device when user input first comes into contact with the depression, ceasing the vibration so that a user feels his or her finger push down into the depression and, after a period of time, re-vibrating the surface of the computing device so that the user feels his or her finger raise back up.

As additional description to the embodiments described below, the present disclosure describes the following embodiments.

Embodiment 1 is a computer-implemented method. The method comprises presenting, by a computing system, visual content on a display device that is covered with a transparent material that defines a depression in a planar surface of the transparent material. The method comprises detecting, by the computing system, that user input has contacted or is about to contact the transparent material at a location of the depression in the planar surface of the transparent material. The method comprises vibrating, by the computing system in response to the computing system detecting that the user input has contacted or is about to contact the transparent material at the location of the depression, the transparent material at the location of the depression using one or more transducers. The method comprises ceasing, by the computing system, the vibration of the transparent material at the location of the depression in response to the computing system determining that criteria for ceasing the vibration has been satisfied.

Embodiment 2 is the computer-implemented method of embodiment 1, wherein the transparent material comprises a transparent lens that covers the display device or a transparent surface layer of the display device.

Embodiment 3 is the computer-implemented method of embodiments 1 or 2, wherein the depression has a depth between 20 microns and 150 microns extending below the planar surface of the transparent material.

Embodiment 4 is the computer-implemented method of claim 3, wherein the planar surface of the transparent material comprises a major face of the transparent material that is planar everywhere except for (1) the depression in the planar surface, (2) any one or more other depressions in the transparent material that have a same depth as the depression in the planar surface, and (3) any non-planar portions at one or more edges of the transparent material.

Embodiment 5 is the computer-implemented method of embodiment 4, wherein the computing system vibrating the transparent material at the location of the depression causes an effect in which the depression in the transparent material is perceived by a user providing the user input to have substantially no depth with respect to the planar surface of the transparent material, in distinction to the depression providing a perceivable depth when user input contacts the depression in the transparent material and the computing system does not vibrate the transparent material at the location of the depression.

Embodiment 6 is the computer-implemented method of any one of embodiments 1 through 5, wherein the computing system vibrating the transparent material at the location of the depression using the one or more transducers includes the computing system simultaneously vibrating multiple transducers with different frequencies, different amplitudes, or different frequencies and amplitudes to generate a vibratory effect localized to the location of the depression, such that the vibrating by the computing system does not generate the vibratory effect at a non-depressed location on the planar surface of the transparent material.

Embodiment 7 is the computer-implemented method of any one of embodiments 1 through 6, further comprising determining, by the computing system, that the user input ceased contacting the location of the depression in the planar surface as the user input moved across the planar surface of the transparent material to contact a non-depressed location of the planar surface of the transparent material. The computing system determining that the criteria for ceasing the vibration has been satisfied includes the computing system having determined that the user input ceased contacting the location of the depression in the planar surface as the user input moved across the planar surface of the transparent material to contact the non-depressed location of the planar surface of the transparent material.

Embodiment 8 is the computer-implemented method of any one of embodiments 1 through 6, wherein the computing system was in a particular state when the user input was detected. The computing system is configured to not vibrate the transparent material at a non-depressed location of the planar surface of the transparent material should the computing system have detected that the user input instead contacted the transparent material at the non-depressed location of the planar surface of the transparent material while the computing system was in the particular state.

Embodiment 9 is the computer-implemented method of embodiment 8, wherein the computing system was in a particular state when the user input was detected. The computing system is configured to not vibrate the transparent material at the location of the depression in the planar surface should the computing system have detected that the user input contacted the transparent material at the location of the depression while a previous user input was in contact with a non-depressed location of the planar surface of the transparent material while the computing system was in the particular state.

Embodiment 10 is the computer-implemented method of any one of embodiments 1 through 6, wherein the computing system vibrates the transparent material at the location of the depression further in response to determining that the computing system is in a first mode in which the computing system is configured to vibrate the transparent material in response to user input contacting the location of the depression. The method further comprises detecting, by the computing system, that a second user input contacted or is about to contact the transparent material at the location of the depression while the computing system is in a second mode in which the computing system is configured to not vibrate the transparent material in response to user input contacting the location of the depression. The computing system does not cause the transparent material to vibrate at any location in response to the computing system detecting that the second user input has contacted or is about to contact the transparent material at the location of the depression while the computing system is in the second mode.

Embodiment 11 is the computer-implemented method of embodiment 10, wherein the first mode comprises a mode in which the computing system is on and the display device is in a display-on mode and is presenting content. The second mode comprises a display-off mode in which the computing system is on and the display device is off or substantially off such that at least most pixels of the display device are off.

Embodiment 12 is the computer-implemented method of any one of embodiments 1 through 6, further comprising detecting, by the computing system, that the user input contacted the transparent material at a non-depressed location of the planar surface and moved across the planar surface to the location of the depression at which point the computing system detected that the user input had contacted or was about to contact the transparent material at the location of the depression in the planar surface. The computing system did not vibrate the transparent material at any location while the user input was moving across the planar surface of the transparent material until the computing system detected that the user input had contacted or was about to contact the transparent material at the location of the depression.

Embodiment 13 is the computer-implemented method of any one of embodiments 1 through 6, wherein the criteria for ceasing vibration includes the computing system having vibrated the transparent material at the location of the depression for a first length of time. The method further comprises subsequently vibrating, by the computing system after the computing system has ceased the vibrating and while the user input remains in contact with the transparent surface at the location of the depression, the surface of the transparent material at the location of the depression in response to the computing system having determined that the computing system has not been vibrating the transparent material at the location of the depression for a second length of time.

Embodiment 14 is the computer-implemented method of any one of embodiments 1 through 6, wherein the criteria for ceasing vibration includes an area of contact between the transparent material and an object providing the user input has increased from an initial area of contact to a larger, first predetermined area of contact. The method further comprises subsequently vibrating, by the computing system after the computing system has ceased the vibrating and while the user input remains in contact with the transparent surface, the surface of the transparent material at the location of the depression in response to the computing system having determined either (i) that the computing system has not been vibrating the transparent material at the location of the depression for a determined length of time, or (ii) that the area of contact between the transparent material and the object providing the user input has decreased to a smaller, second predetermined area of contact that is smaller than the first predetermined area of contact.

Embodiment 15 is directed to one or more computer-readable devices having instructions stored thereon, that when executed by one or more processors, cause the performance of actions according to the method of any one of embodiments 1 through 14.

Embodiment 16 is an electronic device including a material that defines a depression in a planar surface of the material, the planar surface of the material providing at least part of an exterior of the electronic device. The electronic device also includes one or more transducers coupled to the material. The electronic device also includes electronics that are configured to (i) detect that user input has contacted or is about to contact the material at a location of the depression in the planar surface of the material; (ii) vibrate the material at the location of the depression using the one or more transducers in response to the electronics detecting that the user input has contacted or is about to contact the material at the location of the depression; and (iii) cease the vibration of the material at the location of the depression in response to detection of an event.

Embodiment 17 is the electronic device of embodiment 16, wherein the depression has a depth between 20 microns and 150 microns extending below the planar surface of the material.

Embodiment 18 is the electronic device of embodiments 16 or 17, wherein the electronic device comprises multiple transducers coupled to the material. The electronics are configured to vibrate the material at the location of the depression by simultaneously vibrating the multiple transducers with different frequencies, different amplitudes, or different frequencies and amplitudes to generate a vibratory effect localized to the location of the depression, such that the simultaneous vibrating of the multiple transducers does not generate the vibratory effect at a non-depressed location on the planar surface of the transparent material.

Embodiment 19 is the electronic device of any one of embodiments 16 through 18, wherein the material comprises a transparent lens that covers a display device or a transparent surface layer of the display device.

Embodiment 20 is the electronic device of any one of embodiments 16 through 19, wherein the electronics include one or more processors and one or more computer-readable devices. The electronics being configured to detect the user input, vibrate, and cease the vibration includes the one or more computer-readable devices including instructions that when executed by the one or more processors, cause the electronic device to detect the user input, vibrate, and cease the vibration.

Embodiment 21 is directed to a computer-implemented method. The method comprises detecting, by a computing system, that user input has contacted or is about to contact a material at a location of a depression in a planar surface of the material. The method comprises vibrating, by the computing system in response to the computing system detecting that the user input has contacted or is about to contact the material at the location of the depression, the material at the location of the depression using one or more transducers. The method comprises ceasing, by the computing system, the vibration of the material at the location of the depression in response to the computing system determining that criteria for ceasing the vibration has been satisfied.

The details of one or more implementations are set forth in the accompanying drawings and the description below. Other features, objects, and advantages will be apparent from the description and drawings, and from the claims.

DESCRIPTION OF DRAWINGS

FIGS. 3A-D show a flowchart of various operations for vibrating the surface of an electronic device to raise the perceived height at a depression in the surface.

Like reference symbols in the various drawings indicate like elements.

DETAILED DESCRIPTION

This document generally describes vibrating the surface of an electronic device to raise the perceived height at a depression in the surface.

Figure 1:
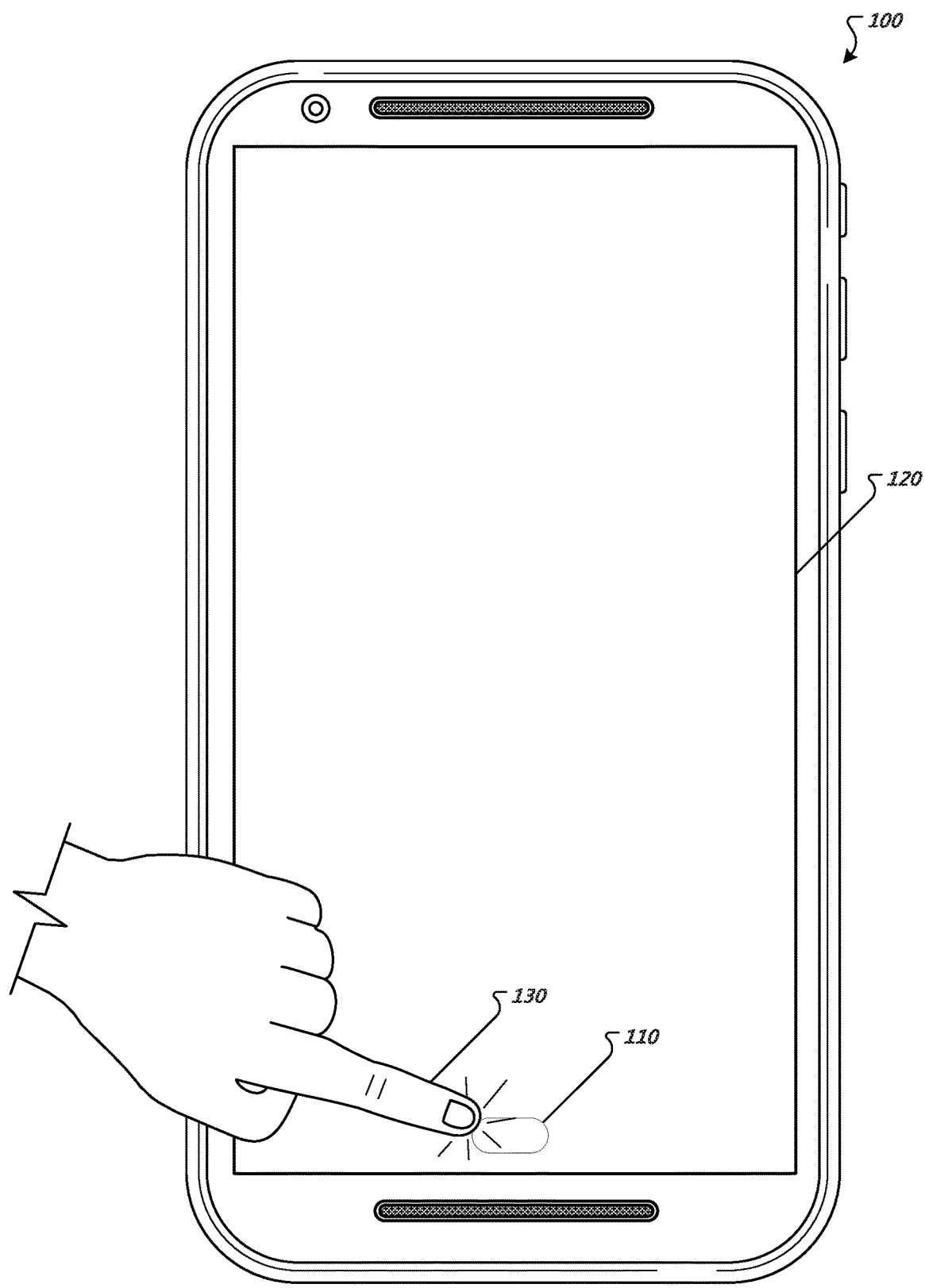
FIG. 1 shows an example computing device that includes a depression in a surface of the computing device.

FIG. 1 shows an example computing device 100 that includes a depression 110 in a surface of the computing device 100. In this example, the computing device 100 is a mobile telephone and the depression 110 is located in a transparent glass lens that covers a display 120 of the computing device 120. FIG. 1 illustrates that the depression 110 is formed at the location of a "home" button in some mobile telephones, and that depression 110 is vibrating in response to an individual contacting the depression 110 with finger 130.

Figure 2:
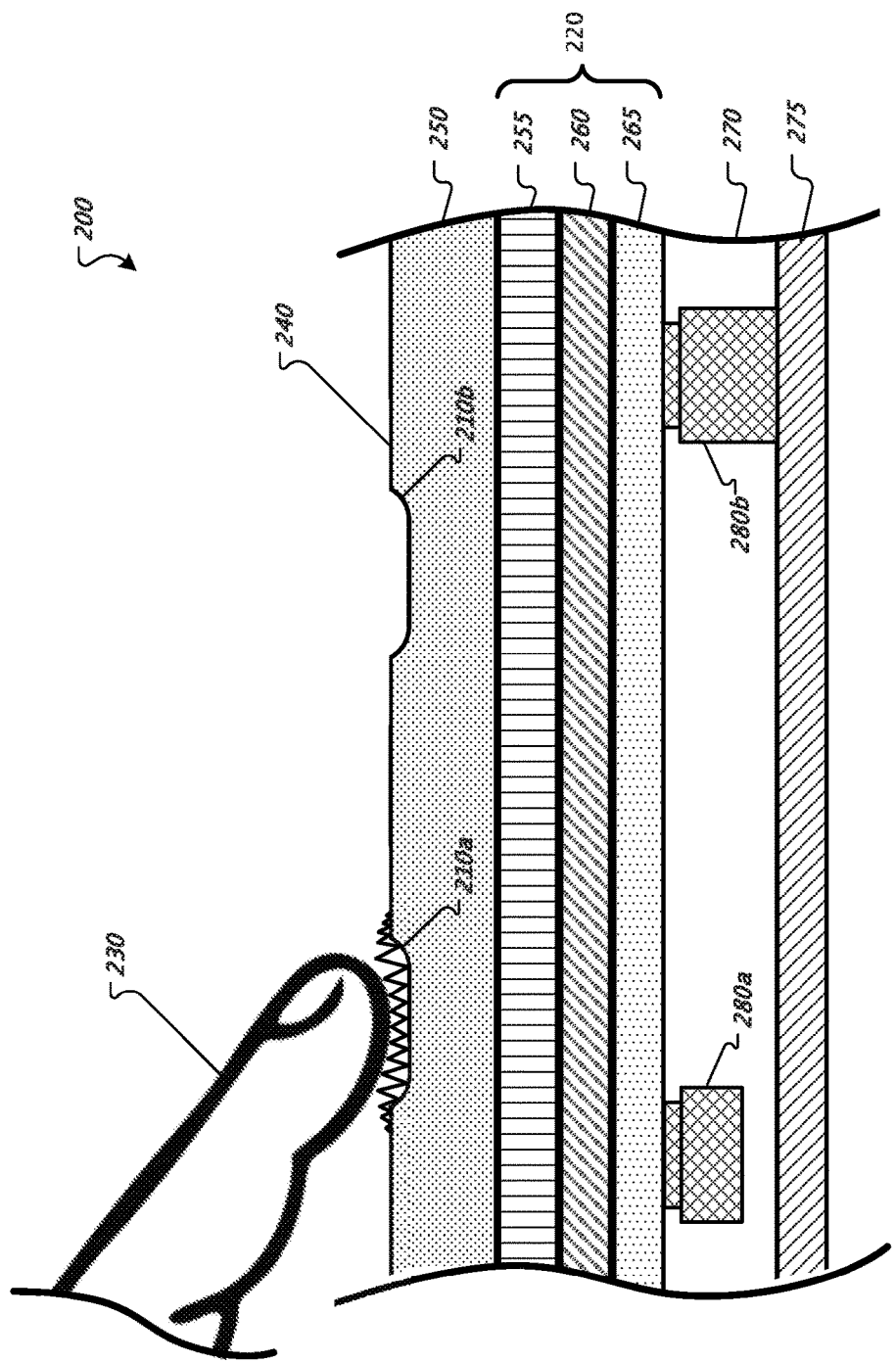
FIG. 2 shows a side, cut-away view of a portion of a computing device that includes multiple depressions in a surface of the computing device.
Figure 3A:
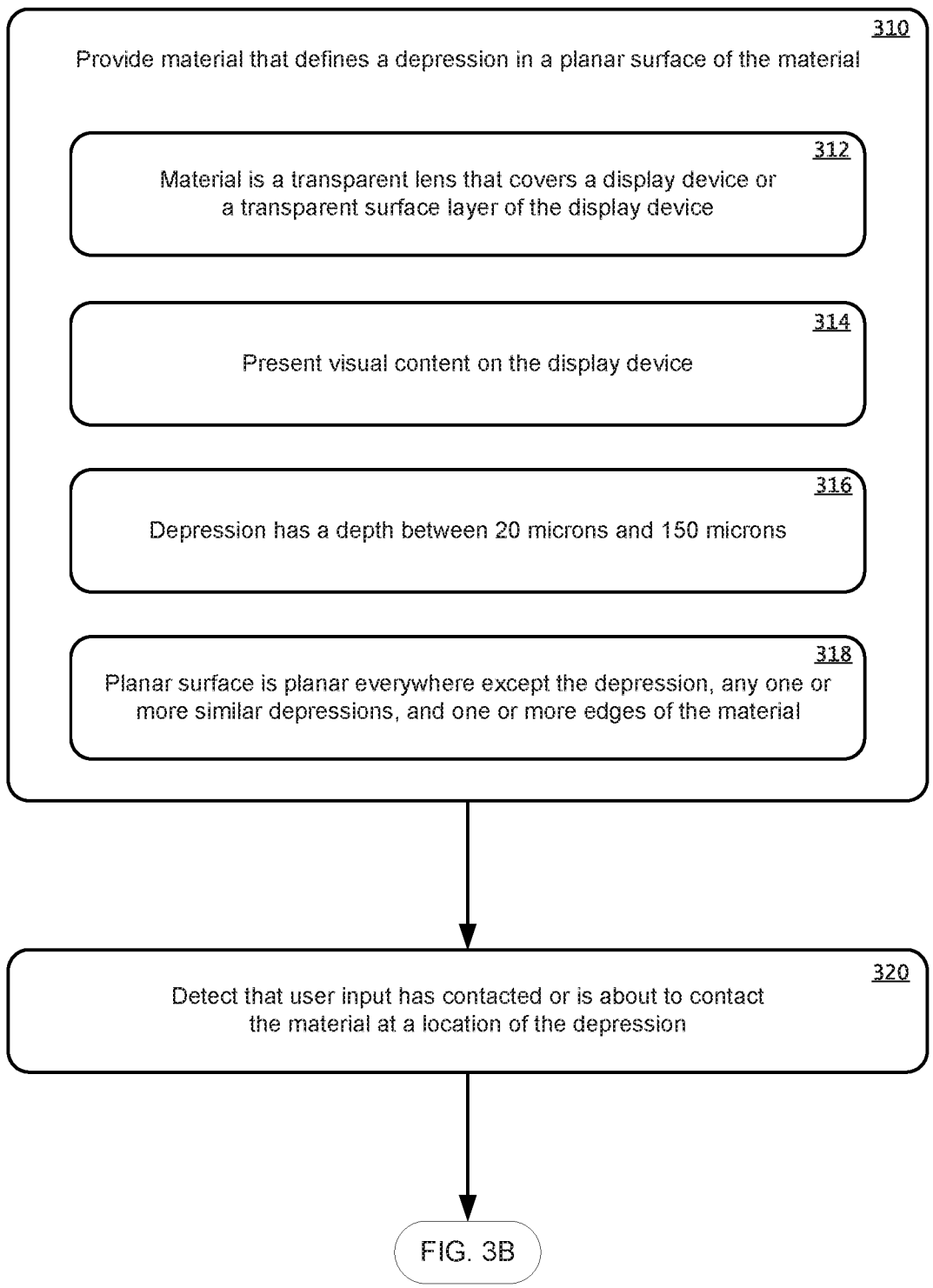

FIG. 2 shows a side, cut-away view of a portion of a computing device 200 that includes multiple depressions 210a-b in a surface of the computing device 200. The computing device 200 may be the same as computing device 100 from FIG. 1, although FIG. 2 illustrates multiple depressions 210a-b instead of the single depression 110 that is illustrated in FIG. 1.

Similar to the illustration of FIG. 1, FIG. 2 shows a finger 230 contacting a surface 240 of a computing device 200 at the location of a depression 210a, and the surface 240 of the computing device 200 vibrating at a location of the contact. FIG. 2 shows that display device 220 includes multiple layers 255, 260, and 265, including an optically clear adhesive layer 255, a polarizer layer 260, and a polyamide layer 265 on which organic light-emitting diode (OLED) transistors are formed. The display layers shown in FIG. 2 are for illustrative purposes only, and the number and type of layers will vary based on the specific display used in a device.

A transparent lens 250 covers the display 220 and provides an external surface of the computing device 200 in this example, although in some examples a transparent layer that is integral with the display 220 may form the external surface of the computing device 200 rather than transparent lens 250. The material that forms the external surface of the computing device 200 may be capable of supporting bending waves and/or surface acoustic waves.

Layer 275 represents a portion of a housing of the computing device 200 or an internal portion of the computing device 200 to which the transducers 280a-b are attached. The transducers 280a-b in this example may be of various types. For example, the transducers 280a-b may be electromagnetic exciters, such as those described in WO97/09859, WO98/34320 and WO99/13684. The transducers 280a-b may also be piezoelectric transducers, magneto-strictive exciters, or a bender or torsional transducer (e.g., of the type taught in WO00/13464). The transducers 280a-b may also be electromechanical exciters that include a vibration device such as a spring loaded mass type, or types that include a rotating shaft and eccentric weight.

FIG. 2 shows two different types of transducers. Transducer 280a is of the inertial type (e.g., the type described in WO97/09842 or WO01/54450, and can apply bending wave energy to the transparent lens 250. Transducer 280b represents a distributed mode actuator that is mounted to not only the display device 220 (like inertial transducer 280a), but also housing 275 of the computing device 200. Although FIG. 2 shows two different types of transducers, a computing device may include multiple of the same type of transducer (e.g., at least 2, 3, 4, 5, 6, 7, or 8 transducers that are all the same type or that are of differing types).

Using multiple transducers may allow computing device 200 to define a more specific location at which haptic forces are generated than if the computing device 200 included only a single transducer. For example, FIG. 2 illustrates that the computing device 200 is only vibrating at the location of the depression 210a, and not at other locations across the surface of the transparent lens 240. The computing device 200 may employ digital signal processing to shape the modulated signal output by each transducer to enhance the panel displacement at the touch location.

In particular, the computing device 200 may employ algorithms that generate electrical signals applied to the transducers to generate the desired haptic sensation at an X, Y position of the transparent lens 250. The appropriate algorithms can include time-reversal filters, simultaneous multi-region filters, infinite impulse response filters, or other filters known in the art. As such, the transfer function between each transducer and the resulting vibration produced at the X, Y position on the transparent lens 250 due to the respective transducer may be different for each transducer. The more transducers used, the potentially greater manipulation of simultaneous maximized and minimized forces and velocity at different locations on a surface of transparent lens 250.

In short, the haptic sensation produced due to vibration generated by transducers may be a maximum at a given location, such that the haptic sensation is effectively localized to the detected touch location and other locations experience reduced or undesired haptic sensations at a given moment. Thus, the output signals for each transducer may be in-phase with each other at the given location, with all the displacements generated by the transducers adding up to the maximum displacement at the given location. At other locations, the output signals may combine in manners that result in phase cancellation. For example, algorithms configured to generate a single pulse at a given location may simultaneously generate a series of vibrations at different other locations.

FIGS. 3A-D show a flowchart of various operations for vibrating the surface of an electronic device to raise the perceived height at a depression in the surface.

At box 310, a material is provided that defines a depression in a planar surface of the material. For example, an individual may use a computing system that defines a depression in a planar, exterior surface of the computing system, for example, the computing device 100 that is shown in FIG. 1, or an electronic device of different design. The depression may have been formed during a manufacturing process by molding, etching, or machining. The depression may form less than 2 $cm^2$, 1.5 $cm^2$, 1 $cm^2$, 0.8 $cm^2$, 0.5 $cm^2$, 0.3 $cm^2$, or 0.2 $cm^2$, and may occupy less than 5%, 3%, 2%, 1%, 0.5%, 0.3%, or 0.1% of what would otherwise be a completely planar surface.

At box 312, the material that defines the depression comprises a transparent lens that covers a display device, or a transparent surface layer of the display device. For example, the material may be the transparent lens 250 that is shown in FIG. 2. In some implementations, the depression may be located in a material that is not transparent and that does not cover a display device. Still, any such non-transparent material may still be touch sensitive, such that the computing system is able to detect user input contacting the material at the location of the depression.

At box 314, the computing system presents visual content on the display device. For example, the depression may be located at a portion of the computing system at which the computing system is able to generate a graphical object using the display device. The computing system may generate a graphical object that has a border that substantially follows a border of the depression, such that the depression and the graphical object have substantially a same shape.

At box 316, the depression has a depth between 20 microns and 150 microns extending below a planar surface of the transparent material. In some implementations, the depression may have a depth of 20-100 microns, 20-80 microns, 30-70 microns, 40-60 microns, 30-100 microns, 30-150 microns, or 20-300 microns.

At box 318, the planar surface comprises all portions of a major face of the material except for the depression, any one or more other depressions that have a same depth as the depression, and any non-planar portions at one or more edges of the transparent material (e.g., rounding or beveling at edges of a transparent cover lens).

At box 320, the computing system detects that user input has contacted or is about to contact the material at a location of the depression. For example, the computing system may be able to monitor contact between the material that defines the depression and an external object such as a finger or a stylus using a touch sensitive layer integrated within the display device and that provides touch sensitivity over the entirety of a content-producing portion of the display device.

The detection described with respect to this box may serve as a trigger to start a vibration feedback mechanism. As such, the detection may either be that user input has contacted the material at a location of the depression or may be that user input has contacted the material near the depression (e.g., closer than 0.5 mm or 1 mm from the depression) and is moving towards the depression such that vibration may be initiated. In some examples, the computing system includes sensing technology that is able to detect when user input is in proximity to the material but has not yet contacted the material (e.g., a user finger is hovering over the material at the location of the depression), and such proximity detection may serve as a trigger to start the vibration feedback mechanism.

At box 330, the computing system vibrates the material at the location of the depression using one or more transducers. The one or more transducers may be coupled to the material indirectly through intermediate materials (e.g., layers of a display), for example, as shown in FIG. 2.

At box 332, the vibrating causes an effect in which the depression in the transparent material is perceived by a user providing the user input to have substantially no depth with respect to the planar surface of the transparent material. This perception of no depth may be in distinction to the depression providing a perceivable depth when user input contacts the depression and the computing system does not vibrate the transparent material at the location of the depression. For example, the depression may be 50 microns deep and the vibrating may be of an intensity that raises the perceived height of the user contact 50 microns. The gain in perceived height can be due to the localized physical displacement of the lens, by localized excitement of nerve endings in the skin (psychophysical haptics), or a combination of both.

At box 334, the computing system simultaneously vibrates multiple transducers with different frequencies, different amplitudes, or different frequencies and amplitudes, such that the vibrating does not generate the vibratory effect at a non-depressed location on the planar surface of the transparent material. For example, the vibrations generated by the different transducers may produce bending waves that reinforce at certain locations of the material and that cancel out at other locations. The characteristics of the vibrations generated by each transducer may be selected in response to detecting a location of the user input, and that location may be used in reference to one or more algorithms, tables, or matrices so that the mechanical waves generated by the transducers reinforce each other to provide a known force at the location of the touch input. A non-depressed location on the planar surface, for example, one or two centimeters away from the depression, may not experience the same vibratory effect. Rather, the non-depressed location may experience no vibration, a vibratory force with a different amplitude, or a different pattern of vibrations.

At box 340, the computing system ceases vibrating the material at the location of the depression in response to the computing system determining that criteria for ceasing the vibration has been satisfied. Ceasing vibration at the location of the depression can include ceasing all vibrations such that no transducer continues to generate a mechanical force, or can include the one or more transducers generating signals that result in a vibratory effect that is localized to another location on the surface of the material, such that substantially no vibratory effect is experienced at the location of the depression.

At box 342, the criteria includes the user input ceasing contact with the location of the depression as the user input moves across the planar surface. For example, the computing system may determine that the user input remains in contact with the surface of the material but no longer contacts the depression, which may be the case when the user is swiping his or her finger across the surface of the material and the finger moves past the location of the depression.

Figure 4:
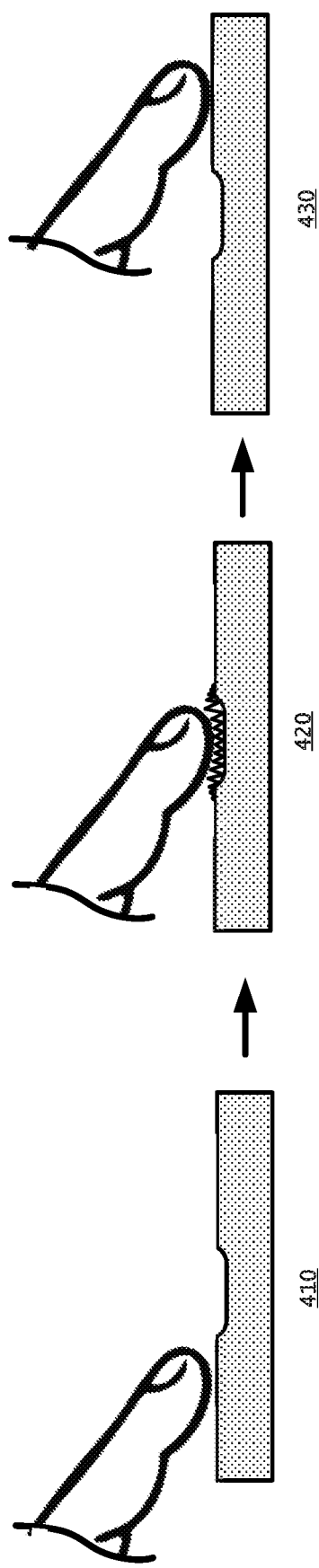
FIG. 4 shows a swiping action in which a finger that provides user input moves across depression in a surface of an electronic device.

Such swiping action is illustrated in FIG. 4, in which a finger that provides user input moves across a non-depressed portion of a material without the material vibrating (state 410), before the user input contacts the depression and the computing system vibrates (state 420), and the user input then moves past the depression and the computing system ceases vibrating (state 430).

At box 344, the criteria includes the computing system having vibrated at the location of the depression for a first length of time. For example, the computing system may be configured to provide a physical indication that the user input has contacted the depression, and therefore may cease vibrating the material after 10 mS, 50 mS, 100 mS, or 250 mS, for example, has passed with the user input in contact with the depression and the computing system vibrating the material at the location of the depression. As a result of the vibration ceasing, a user may feel his or her finger moving down into the depression, providing the experience of a downward button click.

Figure 5:
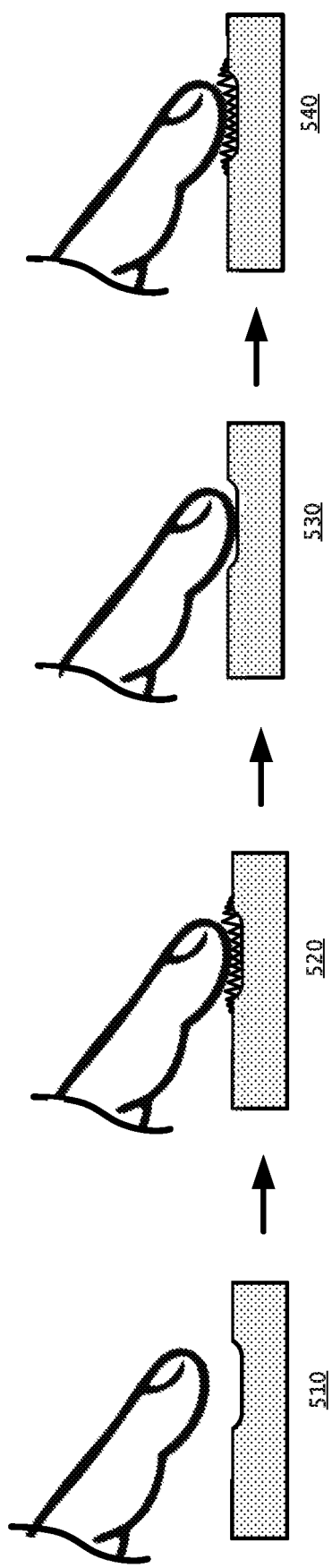
FIG. 5 shows a button click user input experience.

Such a button click user input experience is illustrated in FIG. 5, in which a material does not vibrate before user input has come in contact with the material at the location of the depression (state 510), the material vibrates after or substantially as the user input comes in contact with the material at the location of the depression (state 520), and the material ceases vibrating after a period of time has elapsed with the finger in contact with the depression (state 530). The computing system may re-vibrate the material at the location of the depression (state 540), as described below.

At box 346, the criteria includes an area of contact between the material and an object providing the user input having increased from an initial area of contact to a larger, first predetermined area of contact. Such an increase in an area of contact may occur as a user pushes down with his or her finger, and the finger flattens out and contacts more of the surface of the material. The computing system may react accordingly by ceasing the vibration to provide the user with an impression of a downward button clicking, as illustrated in FIG. 5 with respect to states 510, 520, and 530. In some implementations, instead of the computing system monitoring an increase in the area of contact, the computing system monitors an increase in the force provided by the user input, for example, using one or more force sensors.

At box 350, the computing system subsequently vibrates the material at the location of the depression while the user input remains in contact with the material at the location of the depression. For example, the computing system may determine that the user input remains in contact with the material and begins to again vibrate the material at the location of the depression, as illustrated by state 540 in FIG. 5.

At box 352, the computing system begins to subsequently vibrate the material in response to criteria being satisfied, the criteria including that the user input has remained in contact with the location of the depression after the vibration has ended for 10 mS, 30 mS, 50 mS, 100 mS, 250 mS, or 500 mS. As such, the computing system provides a timed unclick action.

At box 354, the computing system begins to subsequently vibrate the material in response to criteria being satisfied, the criteria including the area of user contact having decreased to a smaller, second predetermined area of contact, with respect to the first predetermined area of contact. As such, the computing system provides a downward click when the user has pressed with sufficient force to flatten his or her finger to crease the first area of contact, and provides an upward click when the user has released sufficiently so that the area of contact decreases to the second area of contact or less (or a period of time has passed, as described with respect to box 354). In some implementations, the computing system can begin to vibrate again and thereby provide the upward click in response to detecting that a force of the user input has decreased below a predetermined threshold.

Boxes 360 through 392 describe exemplary configurations in which the computing system selectively vibrates based on detected locations of one or more user inputs. Examples of the technology described in this disclosure may be implemented using any one or more of the configurations described in boxes 360 through 392.

At box 360, the computing system is configured to not vibrate the material at a non-depressed location of the planar surface of the transparent material should the computing system have detected that the same user input contacted the transparent material at the non-depressed location rather than the depressed location while the computing system was in a same state as when the user input was originally detected. Stated another way, the computing system is configured so that, should the user input have contacted the computing system at an exact same time and state as when it contacted the depression but instead contacted a non-depressed location, the computing device would not have vibrated (e.g., at all or at the non-depressed location). As such, the vibratory action by the computing system may be selective to user input contacting the depression in the material, and may not generically apply to any contact with the surface of the material, at least for certain states.

At box 370, the computing system is configured to not vibrate the material at the location of the depression should the computing system have detected that the user input contacted the material at the location of the depression while a previous user input was in contact with a non-depressed location of the planar surface of the material in a same state as when the user input was detected. Stated another way, the computing system is configured so that, should the user have been touching the material with another finger at a non-depressed location and then provided the user input that contacted the depression, the computing system would not have vibrated. In effect, the computing system may be configured to not vibrate at the location of the depression in response to the user input being part of a multi-touch user input.

At box 380, the computing vibrating the material in response to the user input in response to the computing system being in a first mode. The first mode may be a mode in which the computing system is configured to vibrate the material in response to user input at the depression. This is in contrast with a second mode in which the computing system would not have vibrated the material in response to the user input being received at the depression.

At box 382, the computing system detects a second user input at the depression while the computing system was in the second mode rather than the first mode. The second mode may be a mode in which the computing system is configured to not vibrate in response to user input being received at the depression.

At box 384, the first mode may be a mode in which the computing system is on and the display device is in a display-on mode and presenting content. For example, the computing device may be displaying a home screen with icons for different applications or the computing device may be displaying a user interface of an application program. If displaying an application program, the application program may be able to activate whether or not the computing system vibrates in response to user input that contacts the user depression. In other words, the computing system may include an Application Program Interface (API) that can received commands from application programs, enabling application programs to selectively turn on or off the vibratory effect when the application program has focus.

At box 386, the second mode may be a display-off mode in which the computing system is on and the display device is off or substantially off such that at least most pixels of the display device are off. The computing system may enter the display-off mode in response to not having received user input for a determined amount of time (e.g., 90 seconds, 5 minutes, 10 minutes). The display device being substantially off may include the display device being an OLED display activating less than 15%, 10%, or 5% of its pixels, for example, displaying only a time, date, and notification icons.

The computing system may not vibrate in response to user input contacting the depression at the second location in the second mode to save power, for example, when the device is in the display off mode. As such, the computing device may not have to poll its touch sensors at all or as often to determine if a user has touched the display when in the low-power mode and provide immediate tactile feedback. Rather, the user may be able to feel the depression and know that he or she has provided the correct input, and a slower polling of touch sensors may then determine that user input has contacted the depression and may in response perform some action (e.g., activate the display and/or present an unlock user interface). In some examples, a touch-sensitive layer of the display device is off while in the display-off mode, and a discrete touch sensor that is configured to sense user input contacting the depression is activated to determine whether user input has contacted the touch sensor. In some examples, the second mode includes those modes described above in which the display device is on and an application program has provided a request through the API to deactivate vibration when user input selects the depression.

At box 388, the computing system does not cause the material to vibrate at any location in response to user input contacting the depression when in the second mode. As such, all transducers for vibrating the material may provide no output.

At box 390, the computing system detects that user input contacted the material at a non-depressed location and moved across the planar surface of the material to the location of the depression. In response, the computing system does not vibrate any location while the user input is moving across the planar surface, until the computing system detects that the user input has contacted or is about to contact the depression (box 392). Boxes 390 and 392, in some examples, describe states 410 and 420 of the swiping operation illustrated in FIG. 4 and described previously with respect to box 342.

Figure 6:
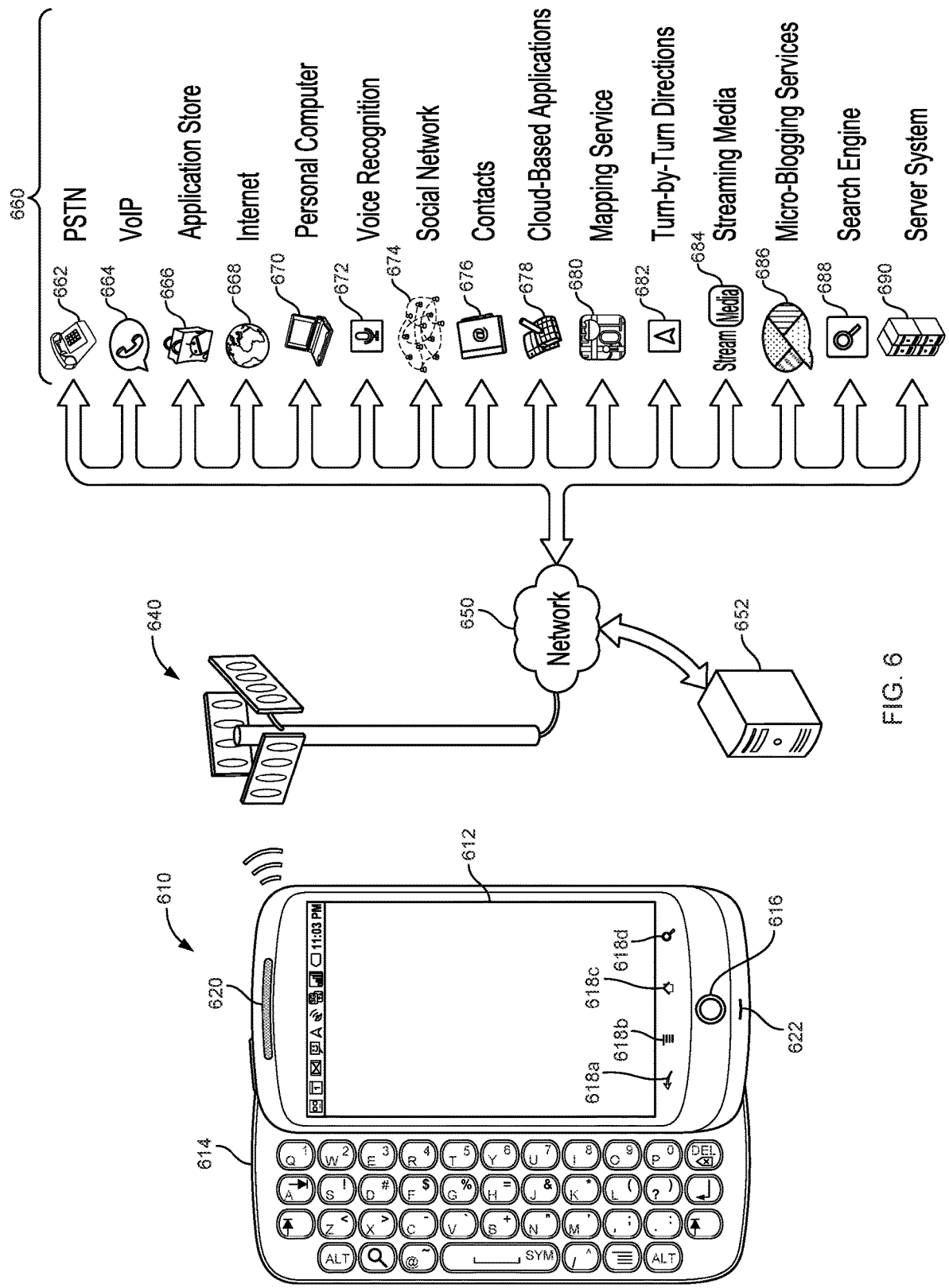
FIG. 6 is a conceptual diagram of a system that may be used to implement the systems and methods described in this document.

Referring now to FIG. 6, a conceptual diagram of a system that may be used to implement the systems and methods described in this document is illustrated. In the system, mobile computing device 610 can wirelessly communicate with base station 640, which can provide the mobile computing device wireless access to numerous hosted services 660 through a network 650.

In this illustration, the mobile computing device 610 is depicted as a handheld mobile telephone (e.g., a smartphone, or an application telephone) that includes a touchscreen display device 612 for presenting content to a user of the mobile computing device 610 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 614, physical buttons, trackballs, accelerometers, gyroscopes, and magnetometers).

Example visual output mechanism in the form of display device 612 may take the form of a display with resistive or capacitive touch capabilities. The display device may be for displaying video, graphics, images, and text, and for coordinating user touch input locations with the location of displayed information so that the device 610 can associate user contact at a location of a displayed item with the item. The mobile computing device 610 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a track pad enables the user to supply directional and rate of movement information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618*a-d*. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" graphical user interface that is displayed after turning on the mobile computing device 610, after activating the mobile computing device 610 from a sleep state, after "unlocking" the mobile computing device 610, or after receiving user-selection of the "home" button 618*c*. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 610 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 610 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 610. The mobile device 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., ETHERNET, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computing systems that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing systems associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call using a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 7:
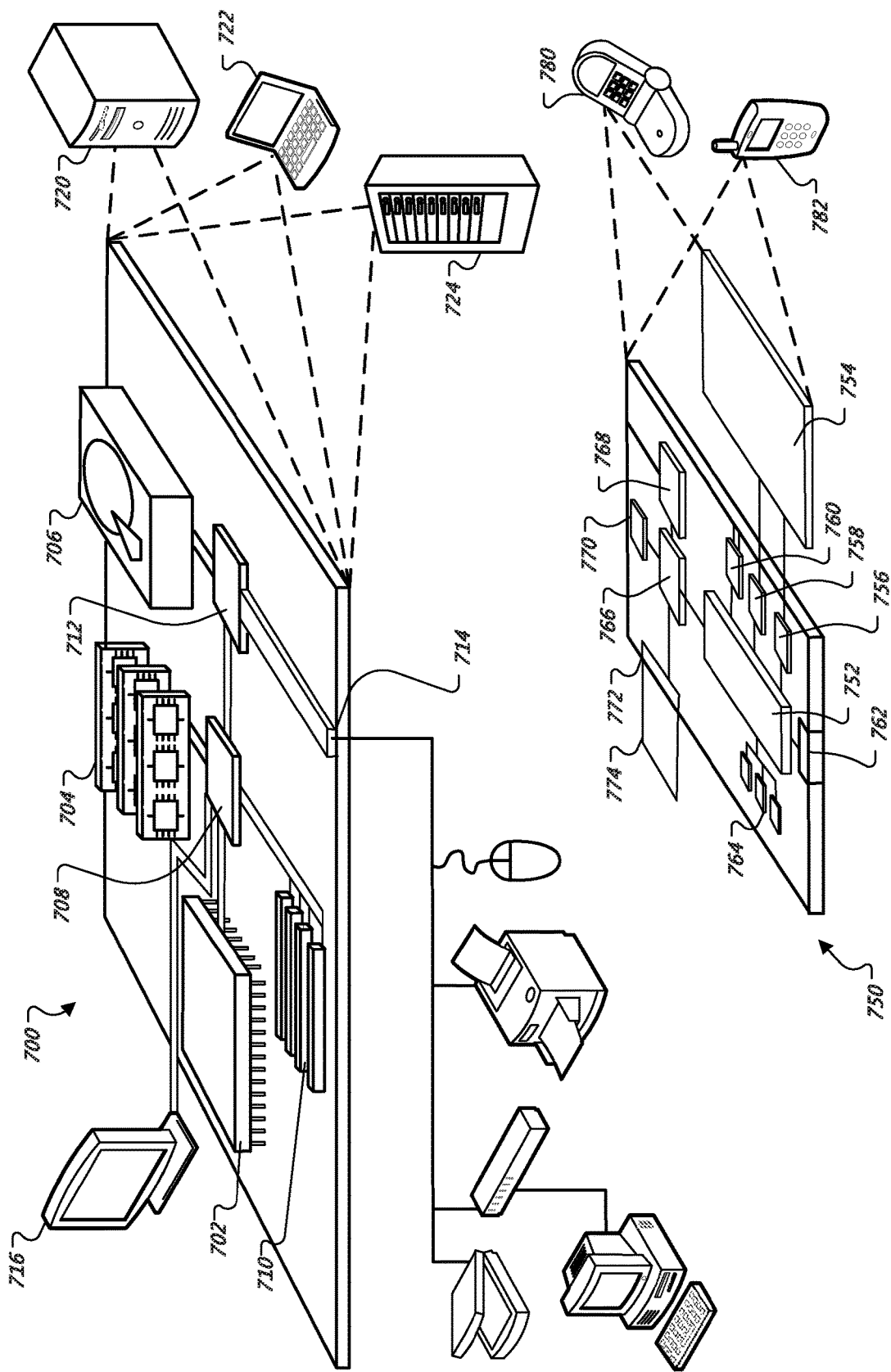
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low speed controller 712 manages lower bandwidth-intensive operations. Such allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provided, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
   presenting, by a computing system, visual content on a display device that is covered with a transparent material that defines a depression in a planar surface of the transparent material;
   detecting, by the computing system, that user input has contacted or is about to contact the transparent material at a location of the depression in the planar surface of the transparent material;
   vibrating, by the computing system in response to the computing system detecting that the user input has contacted or is about to contact the transparent material at the location of the depression, the transparent material at the location of the depression using one or more transducers, wherein the computing system vibrating the transparent material at the location of the depression causes an effect in which the depression in the transparent material is perceived by a user providing the user input to have substantially no depth with respect to the planar surface of the transparent material, in distinction to the depression providing a perceivable depth when user input contacts the depression in the transparent material and the computing system does not vibrate the transparent material at the location of the depression; and
   ceasing, by the computing system, the vibrating of the transparent material at the location of the depression in response to the computing system determining that criteria for ceasing the vibrating has been satisfied.

2. The computer-implemented method of claim 1, wherein the transparent material comprises a transparent lens that covers the display device or a transparent surface layer of the display device.

3. The computer-implemented method of claim 1, wherein the depression has a depth between 20 microns and 150 microns extending below the planar surface of the transparent material.

4. The computer-implemented method of claim 3, wherein the planar surface of the transparent material comprises a major face of the transparent material that is planar everywhere except for (1) the depression in the planar surface, (2) any one or more other depressions in the transparent material that have a same depth as the depression in the planar surface, and (3) any non-planar portions at one or more edges of the transparent material.

5. The computer-implemented method of claim 1, wherein the computing system vibrating the transparent material at the location of the depression using the one or more transducers includes the computing system simultaneously vibrating multiple transducers with different frequencies, different amplitudes, or different frequencies and amplitudes to generate a vibratory effect localized to the location of the depression, such that the vibrating by the computing system does not generate the vibratory effect at a non-depressed location on the planar surface of the transparent material.

6. The computer-implemented method of claim 1, further comprising determining, by the computing system, that the user input ceased contacting the location of the depression in the planar surface as the user input moved across the planar surface of the transparent material to contact a non-depressed location of the planar surface of the transparent material;
   wherein the computing system determining that the criteria for ceasing the vibrating has been satisfied includes the computing system having determined that the user input ceased contacting the location of the depression in the planar surface as the user input moved across the planar surface of the transparent material to contact the non-depressed location of the planar surface of the transparent material.

7. The computer-implemented method of claim 1, wherein:
   the computing system was in a particular state when the user input was detected; and
   the computing system is configured to not vibrate the transparent material at a non-depressed location of the planar surface of the transparent material should the computing system have detected that the user input instead contacted the transparent material at the non-depressed location of the planar surface of the transparent material while the computing system was in the particular state.

8. The computer-implemented method of claim 1, wherein:
   the computing system vibrates the transparent material at the location of the depression further in response to determining that the computing system is in a first mode in which the computing system is configured to vibrate the transparent material in response to user input contacting the location of the depression;
   the method further comprises detecting, by the computing system, that a second user input contacted or is about to contact the transparent material at the location of the depression while the computing system is in a second mode in which the computing system is configured to not vibrate the transparent material in response to user input contacting the location of the depression; and
   wherein the computing system does not cause the transparent material to vibrate at any location in response to the computing system detecting that the second user input has contacted or is about to contact the transparent material at the location of the depression while the computing system is in the second mode.

9. The computer-implemented method of claim 8, wherein:
   the first mode comprises a mode in which the computing system is on and the display device is in a display-on mode and is presenting content; and
   the second mode comprises a display-off mode in which the computing system is on and the display device is off or substantially off such that at least most pixels of the display device are off.

10. The computer-implemented method of claim 1, further comprising:
    detecting, by the computing system, that the user input contacted the transparent material at a non-depressed location of the planar surface and moved across the planar surface to the location of the depression at which point the computing system detected that the user input had contacted or was about to contact the transparent material at the location of the depression in the planar surface;

wherein the computing system did not vibrate the transparent material at any location while the user input was moving across the planar surface of the transparent material until the computing system detected that the user input had contacted or was about to contact the transparent material at the location of the depression.

11. A computer-implemented method, comprising:

presenting, by a computing system, visual content on a display device that is covered with a transparent material that defines a depression in a planar surface of the transparent material;

detecting, by the computing system, that user input has contacted or is about to contact the transparent material at a location of the depression in the planar surface of the transparent material;

vibrating, by the computing system in response to the computing system detecting that the user input has contacted or is about to contact the transparent material at the location of the depression, the transparent material at the location of the depression using one or more transducers, wherein:
  the computing system was in a particular state when the user input was detected, and
  the computing system is configured to not vibrate the transparent material at the location of the depression in the planar surface should the computing system have detected that the user input contacted the transparent material at the location of the depression while a previous user input was in contact with a non-depressed location of the planar surface of the transparent material while the computing system was in the particular state; and ceasing, by the computing system, the vibrating of the transparent material at the location of the depression in response to the computing system determining that criteria for ceasing the vibrating has been satisfied.

12. An electronic device including:

a material that defines a depression in a planar surface of the material, the planar surface of the material providing at least part of an exterior of the electronic device;

one or more transducers coupled to the material; and electronics that are configured to:
  detect that user input has contacted or is about to contact the material at a location of the depression in the planar surface of the material;
  vibrate the material at the location of the depression using the one or more transducers in response to the electronics detecting that the user input has contacted or is about to contact the material at the location of the depression, wherein the electronics vibrating the transparent material at the location of the depression causes an effect in which the depression in the transparent material is perceived by a user providing the user input to have substantially no depth with respect to the planar surface of the transparent material, in distinction to the depression providing a perceivable depth when user input contacts the depression in the transparent material and the electronic device does not vibrate the transparent material at the location of the depression; and
  cease the vibrating of the material at the location of the depression in response to detection of an event.

13. The electronic device of claim 12, wherein the depression has a depth between 20 microns and 150 microns extending below the planar surface of the material.

14. The electronic device of claim 12, wherein:
  the electronic device comprises multiple transducers coupled to the material; and
  the electronics are configured to vibrate the material at the location of the depression by simultaneously vibrating the multiple transducers with different frequencies, different amplitudes, or different frequencies and amplitudes to generate a vibratory effect localized to the location of the depression, such that the simultaneous vibrating of the multiple transducers does not generate the vibratory effect at a non-depressed location on the planar surface of the transparent material.

15. The electronic device of claim 12, wherein the material comprises a transparent lens that covers a display device or a transparent surface layer of the display device.

16. The electronic device of claim 12, wherein:
  the electronics include one or more processors and one or more computer-readable devices; and
  the electronics being configured to detect the user input, vibrate the material, and cease the vibrating includes the one or more computer-readable devices including instructions that when executed by the one or more processors, cause the electronic device to detect the user input, vibrate the material, and cease the vibrating.

17. A computer-implemented method, comprising:

presenting, by a computing system, visual content on a display device that is covered with a transparent material that defines a depression in a planar surface of the transparent material;

detecting, by the computing system, that user input has contacted or is about to contact the transparent material at a location of the depression in the planar surface of the transparent material;

initially vibrating, by the computing system in response to the computing system detecting that the user input has contacted or is about to contact the transparent material at the location of the depression, the transparent material at the location of the depression using one or more transducers;

ceasing, by the computing system, the vibrating of the transparent material at the location of the depression in response to the computing system determining that first criteria for ceasing the vibrating has been satisfied; and subsequently vibrating, by the computing system after the computing system has ceased the vibrating and while the user input remains in contact with the transparent material at the location of the depression, the transparent material at the location of the depression in response to the computing system having determined that second criteria for resuming the vibrating has been satisfied, wherein the computing system initially vibrating the transparent material, then ceasing the vibrating, and then subsequently vibrating the transparent material at the location of the depression causes an effect in which the depression in the transparent material is perceived by a user providing the user input to initially have substantially no depth, then have depth, and then subsequently have substantially no depth while the user input remains in contact with the transparent material at the location of the depression.

18. The computer-implemented method of claim 17, wherein:
- the first criteria includes the computing system having vibrated the material at the location of the depression for a first length of time; and
- the second criteria includes the computing system having ceased the vibrating at the location of the depression for a second length of time.

19. The computer-implemented method of claim 17, wherein:
- the first criteria includes an area of contact between the transparent material and an object providing the user input having increased from an initial area of contact to a larger, first area of contact; and
- the second criteria includes either (i) the computing system having not been vibrating the transparent material at the location of the depression for a determined length of time, or (ii) the area of contact between the transparent material and the object having decreased to a smaller, second area of contact that is smaller than the first area of contact.

20. An electronic device including:
a material that defines a depression in a planar surface of the material, the planar surface of the material providing at least part of an exterior of the electronic device;
one or more transducers coupled to the material; and
electronics that are configured to:
- detect that user input has contacted or is about to contact the material at a location of the depression in the planar surface of the material;
- vibrate the material at the location of the depression using one or more transducers, responsive to the electronics detecting that the user input has contacted or is about to contact the material at the location of the depression wherein:
  - the electronic device was in a particular state when the user input was detected, and
  - the electronic device is configured to not vibrate the material at the location of the depression in the planar surface should the electronics have detected that the user input contacted the material at the location of the depression while a previous user input was in contact with a non-depressed location of the planar surface of the material while the electronic device was in the particular state; and
- cease, by the computing system, the vibrating of the transparent material at the location of the depression in response to the electronics determining that criteria for ceasing the vibrating has been satisfied.

21. An electronic device including:
a material that defines a depression in a planar surface of the material, the planar surface of the material providing at least part of an exterior of the electronic device;
one or more transducers coupled to the material; and
electronics that are configured to:
- detect that user input has contacted or is about to contact the material at a location of the depression in the planar surface of the material;
- initially vibrate, by the electronic device in response to the electronics detecting that the user input has contacted or is about to contact the material at the location of the depression, the material at the location of the depression using one or more transducers;
- cease the vibrating of the material at the location of the depression in response to the electronics determining that first criteria for ceasing the vibrating has been satisfied; and
- subsequently vibrate, after the electronic device has ceased the vibrating and while the user input remains in contact with the material at the location of the depression, the material at the location of the depression in response to the electronics having determined that second criteria for resuming the vibrating has been satisfied,
wherein the electronic device initially vibrating the material, then ceasing the vibrating, and then subsequently vibrating the material at the location of the depression causes an effect in which the depression in the material is perceived by a user providing the user input to initially have substantially no depth, then have depth, and then subsequently have substantially no depth while the user input remains in contact with the material at the location of the depression.

* * * * *